(12) United States Patent  
Wang

(10) Patent No.: US 8,858,327 B2  
(45) Date of Patent: Oct. 14, 2014

(54) METHOD AND DEVICE FOR PROVIDING A GAME

(71) Applicant: NVIDIA Corporation, Santa Clara, CA (US)

(72) Inventor: Fei Wang, Guangzhou (CN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/667,993

(22) Filed: Nov. 2, 2012

(65) Prior Publication Data

US 2014/0051509 A1   Feb. 20, 2014

(30) Foreign Application Priority Data

Aug. 14, 2012 (CN) .......................... 2012 1 0288525

(51) Int. Cl.
*A63F 13/00* (2014.01)

(52) U.S. Cl.
USPC ............................................ 463/31; 455/420

(58) Field of Classification Search
CPC ... G06F 1/1632; G06F 1/1626; G06F 1/3265; G01C 21/265; G01C 21/3608
USPC ...................................... 463/31–43
See application file for complete search history.

(56) References Cited

U.S. PATENT DOCUMENTS

| | | | |
|---|---|---|---|
| 7,330,737 B2* | 2/2008 | Mahini .......................... | 455/557 |
| 8,131,898 B2* | 3/2012 | Shah et al. ...................... | 710/73 |
| 8,250,277 B2* | 8/2012 | Tseng et al. ................... | 710/303 |
| 8,250,278 B2* | 8/2012 | Tseng et al. ................... | 710/303 |
| 8,260,998 B2* | 9/2012 | Ganesh et al. ................. | 710/303 |
| 8,260,999 B2* | 9/2012 | Ganesh et al. ................. | 710/303 |
| 8,275,920 B2* | 9/2012 | Shah et al. ....................... | 710/73 |
| 2007/0015485 A1* | 1/2007 | DeBiasio et al. ............. | 455/345 |
| 2007/0086724 A1* | 4/2007 | Grady et al. .................... | 386/46 |
| 2008/0307144 A1* | 12/2008 | Minoo .......................... | 710/304 |
| 2009/0061841 A1* | 3/2009 | Chaudhri et al. ............. | 455/420 |
| 2010/0069123 A1* | 3/2010 | Araradian et al. ............ | 455/566 |
| 2010/0214216 A1* | 8/2010 | Nasiri et al. .................. | 345/158 |
| 2011/0163955 A1* | 7/2011 | Nasiri et al. .................. | 345/158 |
| 2013/0040623 A1* | 2/2013 | Chun et al. ................. | 455/414.2 |
| 2013/0109371 A1* | 5/2013 | Brogan et al. ................ | 455/420 |

\* cited by examiner

*Primary Examiner* — Masud Ahmed
(74) *Attorney, Agent, or Firm* — Zilka-Kotab, PC

(57) ABSTRACT

The present invention discloses a method and a device for providing a game. The method includes: a detection step, for determining an additional display device being attached to a mobile device; and a push step, for pushing multimedia information of the game to the additional display device to be presented by the additional display device, and pushing a visual human machine interface of the game to a display of the mobile device to be displayed by the display; wherein, a controlled object displayed on the additional display device is controlled by the visual human machine interface. The above-mentioned method and device for providing a game can make a game machine have a smaller size and be more portable, display multimedia information of a game on a bigger screen for players and provide players with a visual human machine interface on the entire screen of a mobile device, and therefore it improves user experiences.

18 Claims, 5 Drawing Sheets

METHOD AND DEVICE FOR PROVIDING A GAME

CROSS-REFERENCE TO RELATED APPLICATION

This application claims priority to Chinese Patent Application No. 201210288525.0, filed on Aug. 14, 2012, which is hereby incorporated by reference in its entirety.

FIELD OF INVENTION

The present invention relates generally to a field of the game, and specifically to a method and a device for providing a game.

BACKGROUND

At present, people's pressure is heavier and heavier. Playing games becomes a main way for people to release pressure. FIG. 1 shows a traditional game system 10. As shown in FIG. 1, the traditional game system 10 includes a game console 11 and a gamepad 12. The gamepad 12 is a game controller held in two hands of a player, which is in communication with the game console 11 via a wired or wireless connection. The gamepad 12 generally includes action buttons controlled by the right hand and direction buttons controlled by the left hand. Wherein, as shown in FIG. 1, the direction buttons may usually control four directions. A display device 13 is connected to the game console 11. The display device 13 may receive audio and video signals from the game console 11 and present them to the player by its screen and speakers. The player may control controlled objects displayed on the screen of the display device 13 by the gamepad 12.

Although the game system 10 described above can meet demands of entertainment, it has a large size and is not portable due to including not only the game console 11 but also the gamepad 12.

With the development of science and technology, the computing function of processors is becoming more and more powerful. Nowadays the handheld mobile device, such as Personal Digital Assistant, Smart Phone and the like, can also provide games. However, it often provides the game using gravity sensing, for example, the Car Race and the like. It may also provide the game in which the entire screen both presents multimedia information of the game and acts as a visual human machine interface, for example, the Fruit Slice and the like. The screen of the handheld mobile device is usually smaller, such that the user experience is poorer during the procedure of playing a game because of using the screen of the handheld mobile device to present the multimedia information of the game.

Therefore, there is a need of providing a method and a device for providing a game to solve the above problems.

SUMMARY OF THE INVENTION

A series of concepts in abbreviated forms are introduced in the summary of the invention, which will be further explained in detail in the part of detailed description. This part of the present invention does not mean trying to define key features and essential technical features of the technical solution claimed for protection; even not mean trying to determine a protection scope of the technical solution claimed for protection.

In order to solve the aforementioned problems, the present invention discloses a method for providing a game including: a detection step, for determining an additional display device being attached to a mobile device; and a push step, for pushing multimedia information of the game to the additional display device to be presented by the additional display device, and pushing a visual human machine interface of the game to a display of the mobile device to be displayed by the display; wherein, a controlled object displayed on the additional display device is controlled by the visual human machine interface.

In a preferred embodiment of the present invention, the detection step further includes determining that a player would like to present the multimedia information on the additional display device.

In a preferred embodiment of the present invention, the visual human machine interface includes a direction control part, for controlling a direction of movement of the controlled object; and an action control part, for controlling an action of the controlled object.

In a preferred embodiment of the present invention, the direction control part is located in a left area of the visual human machine interface, and the action control part is located in a right area of the visual human machine interface.

In a preferred embodiment of the present invention, there is a gap area between the direction control part and the action control part.

Preferably, the width of the gap area ranges from 0.5 cm to 1.5 cm.

Optionally, the attachment is implemented by wireless communication.

Optionally, the attachment is implemented by a wired connection. Preferably, the wired connection includes a high-definition multimedia interface connection.

According to another aspect of the present invention, a device for providing a game is also provided, including: a detection module, for determining an additional display device being attached to a mobile device; and a push module, for pushing multimedia information of the game to the additional display device to be presented by the additional display device, and pushing a visual human machine interface of the game to a display of the mobile device to be displayed by the display; wherein, a controlled object displayed on the additional display device is controlled by the visual human machine interface.

In a preferred embodiment of the present invention, the detection module is further used for determining that a player would like to present the multimedia information on the additional display device.

In a preferred embodiment of the present invention, the visual human machine interface includes a direction control part, for controlling a direction of movement of the controlled object; and an action control part, for controlling an action of the controlled object.

In a preferred embodiment of the present invention, the direction control part is located in a left area of the visual human machine interface, and the action control part is located in an right area of the visual human machine interface.

In a preferred embodiment of the present invention, there is a gap area between the direction control part and the action control part.

Preferably, the width of the gap area ranges from 0.5 cm to 1.5 cm.

Optionally, the attachment is implemented by wireless communication.

Optionally, the attachment is implemented by a wired connection. Preferably, the wired connection includes a high-definition multimedia interface connection.

In a preferred embodiment of the present invention, the mobile device includes a smart phone or a tablet computer.

In a preferred embodiment of the present invention, the display includes a capacitive touch screen.

The above-mentioned method and device for providing a game provided by the present invention can make a game machine have a smaller size and be more portable; display multimedia information of a game on a bigger screen for players and provide players with a visual human machine interface on the entire screen of a mobile device, and therefore it improves user experiences.

BRIEF DESCRIPTION OF THE DRAWINGS

The following accompanying drawings of the present invention as a part of the present invention herein are used for understanding of the present invention, the implementations and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Detailed structures will be presented in the following description for more thoroughly appreciation of the invention. Obviously, the implementation of the invention is not limited to the special details well-known by those skilled in the art. Preferred embodiments are described as following; however, the invention could also comprise other ways of implementations.

Figure 1:
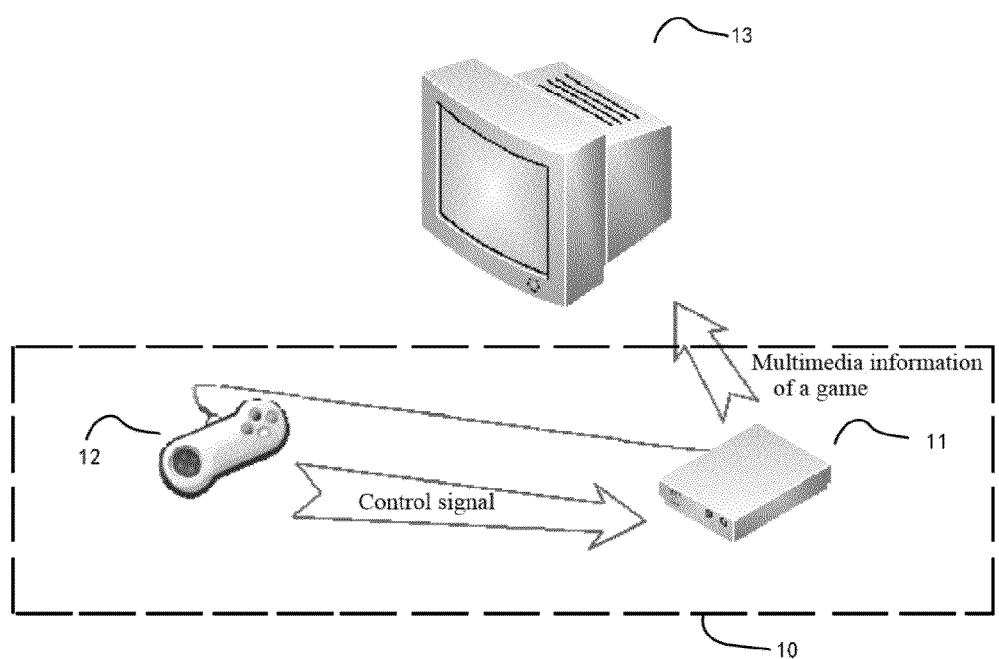
FIG. 1 shows a diagram of a traditional game system.
Figure 2:
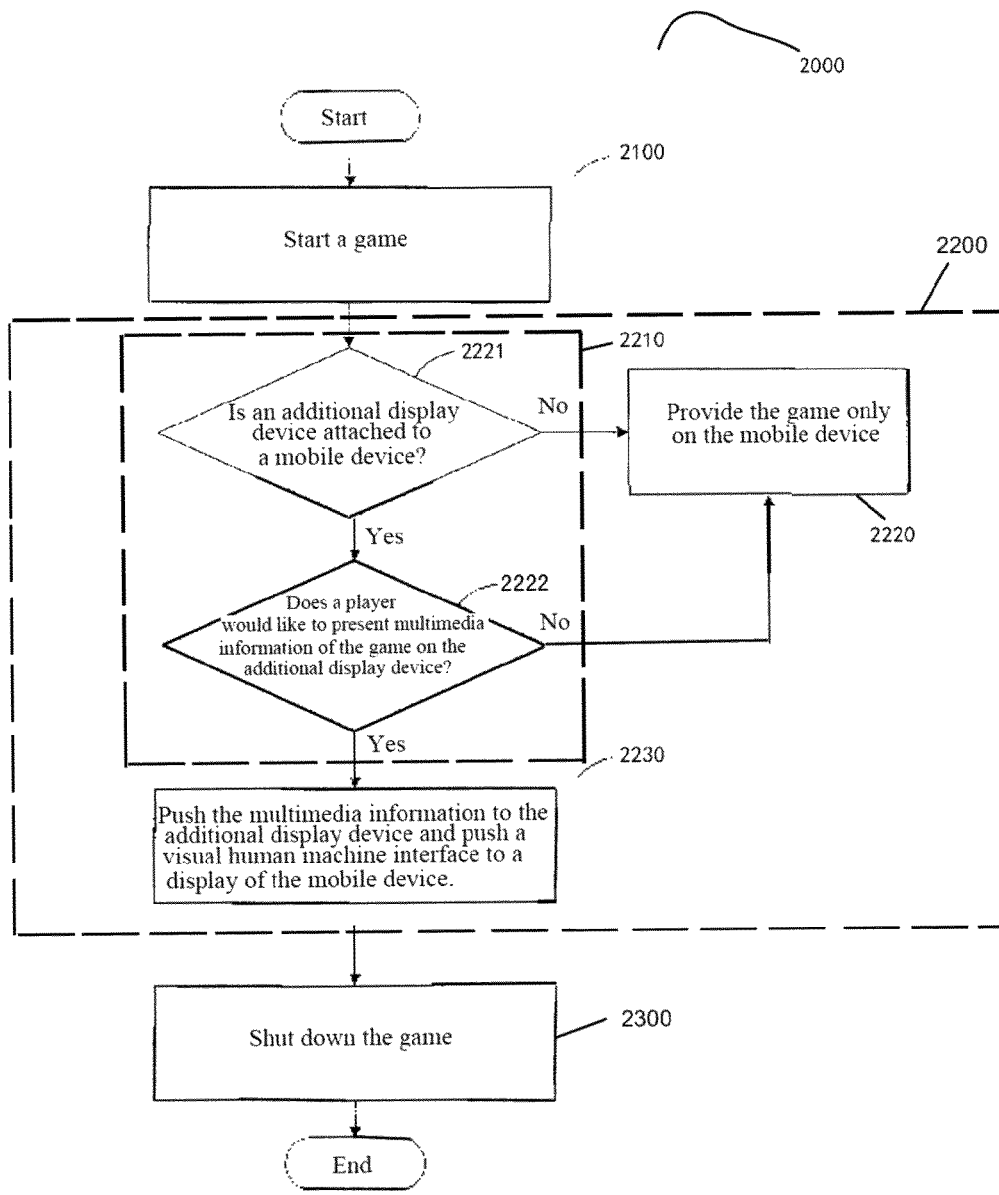
FIG. 2 shows a flow chart of a method for running a game.

FIG. 2 shows a flow chart of a method 2000 for running a game. The method 2000 for running a game includes starting the game 2100, providing the game 2200 and shutting down the game 2300.

A process of providing the game 2200 will be described below in detail according to a preferred embodiment of the present invention. As shown in FIG. 2, the process of providing the game 2200 may include a detection step 2210 and a push step 2230. Optionally, the process of providing the game 2200 may also include a step 2220 where the game is provided only on a mobile device.

The detection step 2210 may include a step 2221 where it is determined that whether an additional display device is attached to the mobile device. The mobile device may detect an interface at a fixed clock frequency via which it communicates with the additional display device to determine whether there is the additional display device being attached to the mobile device.

The attachment between the additional display device and the mobile device may be implemented by wireless communication or a wired connection. In other words, the above-mentioned interface may be a wireless interface or a wired interface. The wireless interface includes for example Bluetooth interface, WIFI interface and the like. The wired interface includes for example high-definition multimedia interface (HDMI), coaxial-cable interface and the like.

Preferably, the detection step 2210 may also include a step 2222 where it is determined whether a player would like to present the multimedia information on the additional display device. The mobile device may for example ask the player that if he would like to present the multimedia information on the additional display device, and then determine the player's will by receiving the player's input.

It can be understood by those skilled in the art that there are no temporal order relations between the Step 2221 and the Step 2222. In other words, any one of these two may be performed firstly, and then the other one.

If it is determined that there is the additional display device being attached to the mobile device and the player would like to present multimedia information on the additional display device (if there is the step 2222), then the process 2200 proceeds to a push Step 2300. Otherwise, the process 2200 proceeds to a Step 2220 where the game is provided only on the mobile device.

The push step 2300 includes that the multimedia information of the game is pushed to the additional display device to be presented by the additional display device, and the game's visual human machine interface is pushed to the display of the mobile device to be displayed by the display. Wherein, a controlled object displayed on the additional display device is controlled by the visual human machine interface which takes the place of a traditional gamepad. A game application running on the mobile device can control the controlled object of the game in response to the user input received via the visual human machine interface.

It is well known that the computing capability of processors is more and more powerful, and so is the multitask processing capability. Processors now can not only provide high-definition video output, such as 720P, 1080I, and 1080P video output, but also provide the synchronous display of multi-channel video signals. In the present invention, the multimedia information and the visual human machine interface of the game can be displayed on different devices or apparatuses, respectively.

The game application may include many functions that can respond to user events. The user events include the player's input received via the visual human machine interface. The control of the displayed controlled object may be achieved by performing the functions that respond to the user events.

For example, in a football game, a controlled athlete running to the right in a game video is controlled by responding to a player's finger sliding to the right of the screen. So-called running to the right means that the athlete is displayed at a location with moving tendency toward the right. Thus, the abscissa of the athlete's location in the football game application can be increased to respond to the player's finger sliding to the right, and the control of the athlete can be achieved.

With the above process 2200 for providing the game, the game video can be displayed on the additional display device during the procedure of playing the game, and at the same time the controlled object in the game video can be controlled on the display of a mobile device. The additional display device may be for example a television, a projector and the like. The mobile device may be a specialized game device.

The mobile device may also provide other additional functions, such as phone call, Internet functions and the like. That is, the mobile device can be a smart phone, a tablet computer and the like. Preferably, the display of the mobile device includes a capacitive touch screen.

Since the game video is displayed on the additional display device, people can watch video content of the game on a bigger screen. In addition, the entire screen of the mobile device is used for the visual human machine interface, which makes the visual human machine interface have a strong operability and mis-operation be effectively avoided. These factors effectively improve user experiences.

Figure 3:
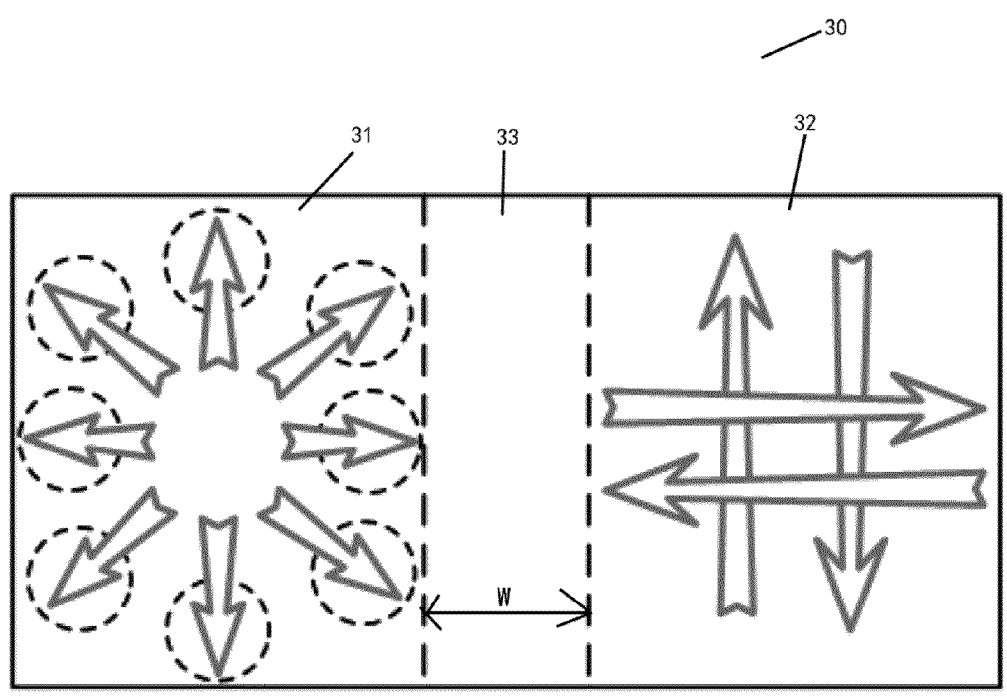
FIG. 3 shows a diagram of a visual human machine interface according to a preferred embodiment of the present invention.

The method for providing a game is described above in detail, in which the visual human machine interface takes the place of a gamepad in a current game system. Thus the game machine has a smaller size and is more portable. FIG. 3 now will be referenced to describe a visual human machine interface 30 in detail according to a preferred embodiment of the present invention. As shown in FIG. 3, the visual human machine interface 30 may include a direction control part 31 and an action control part 32.

The direction control part 31 can be used for controlling a direction of movement of a controlled object. For example, a movement of the controlled object can be triggered by a finger's corresponding slide across the screen. Since a finger can slide across the screen in any direction, the visual human machine interface according to a preferred embodiment of the present invention can control a controlled object to move in any direction. Eight directions are shown in FIG. 3, but it is apparent to those skilled in the art that it is not limited to these eight directions.

The action control part 32 can be used for controlling a controlled object's action, such as an athlete's shot, passing the ball and the like in a football game. As shown in FIG. 3, a controlled object's action is controlled by the way of a finger's slide in different directions (up, down, left, and right). In this case, the finger keeping still at a location won't trigger any action. But it can be understood by those skilled in the art that touching different areas of the action control part 32 can also be defined to control the controlled object's different actions.

Optionally, the direction control part 31 may be located in a left area of the visual human machine interface, and the action control part 32 may be located in a right area of the visual human machine interface. Thus, it is in accord with the ergonomics and more suitable for the gaming habits of the human.

Preferably, there is a gap area 33 between the direction control part 31 and the action control part 32, where no finger action can be responded to. Thus, mis-operation can be successfully avoided.

Preferably, the width of the gap area 33 ranges from 0.5 cm to 1.5 cm. The width enables the gap area 33 to occupy as little screen area as possible while the mis-operation can be effectively avoided.

Figure 4:
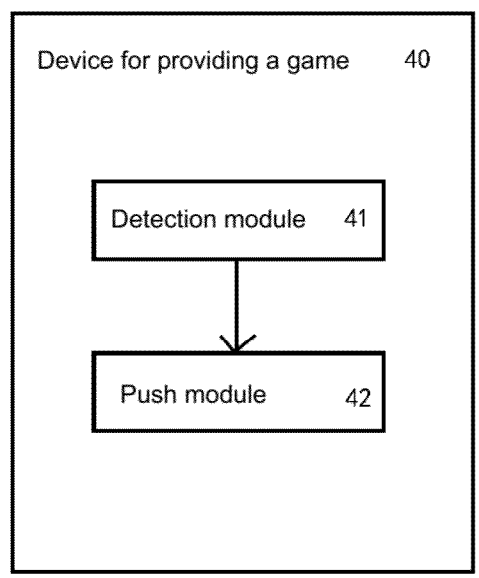
FIG. 4 shows a block diagram of a device for providing a game according to a preferred embodiment of the present invention.

A device for providing a game is also provided according to another aspect of the present invention. FIG. 4 shows a block diagram of a device 40 for providing a game according to a preferred embodiment of the present invention. As shown in FIG. 4, the device includes a detection module 41 and a push module 42.

The detection module 41 is used for determining an additional display device being attached to a mobile device. The attachment between the additional display device and the mobile device can be implemented by wireless communication or a wired connection. The wired connection may include a high-definition multimedia interface connection.

Optionally, the mobile device may include a smart phone or a tablet computer. Optionally, a display of the mobile device includes a resistive touch screen or a capacitive touch screen. A capacitive touch screen is preferred therein.

According to a preferred embodiment of the present invention, the detection module 41 is further used for determining whether a player would like to present multimedia information on the additional display device.

The push module 42 is used for pushing the multimedia information of the game to the additional display device to be presented by the additional display device, and pushing a visual human machine interface of the game to the display of the mobile device to be displayed by the display. A controlled object displayed on the additional display device is controlled by the visual human machine interface.

Herein the visual human machine interface is the same as the visual human machine interface described in the above mentioned method embodiment. For simplicity, a specific description is omitted for the visual human machine interface. Those skilled in the art can understand the specific structure and the running way of the visual human machine interface by referring to FIG. 3 and combining the description above.

Figure 5:
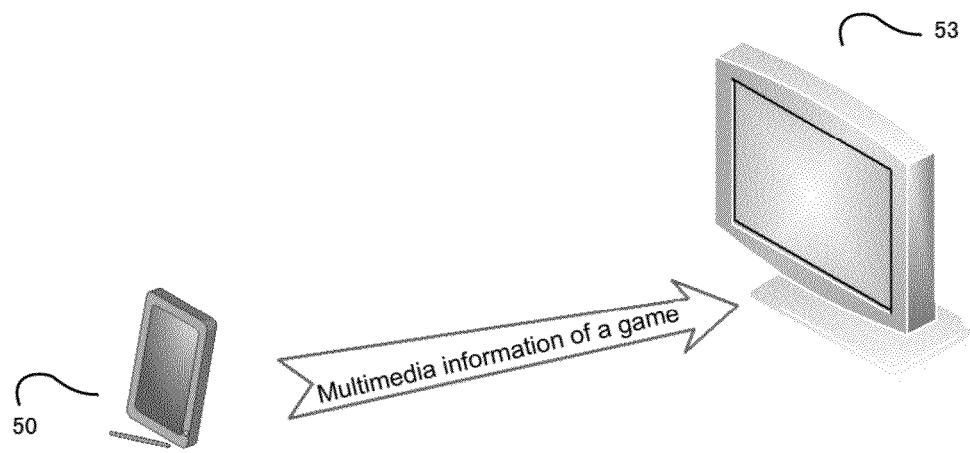
FIG. 5 shows a diagram of a game machine including a device for providing a game according to a preferred embodiment of the present invention.

FIG. 5 shows a diagram of a game machine 50 that includes a device for providing a game according to a preferred embodiment of the present invention. As shown in FIG. 5, the game machine 50 can push multimedia information of a game to a television 53 and there is not any input device included therein, such as a gamepad and the like. The game machine 50 is free from a gamepad and very portable. In addition, the game machine 50 can transmit the multimedia information of the game to an additional display device, and display a visual human machine interface on its display to improve user experiences.

The present invention has been described through the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

What is claimed is:

1. A method, comprising:
    determining that an additional display device is attached to a mobile device;
    pushing multimedia information for a game to the additional display device to be presented by the additional display device; and
    pushing a visual human machine interface for the game to a display of the mobile device to be presented by the display, of the mobile device,
    wherein a controlled object displayed on the additional display device is controlled by the visual human machine interface, and
    wherein the visual human machine interface comprises:
        a direction control part for controlling a direction of movement of the controlled object, the direction control part being associated with substantially a first half of the display, of the mobile device and configured to move the controlled object at least up, down, left, and right, and second control part-being associated with substantially a second half of the display; wherein the second control part comprises a game action control part that is configured to control an action of the controlled object.

2. The method according to claim 1, wherein the visual human machine interface includes a gap area between the direction control part and the action control part.

3. The method according to claim 2, wherein a width of the gap area ranges from 0.5 cm to 1.5 cm.

4. The method of claim 1, wherein controlling the direction of movement of the controlled object is performed by swiping a finger across the display of the mobile device in a control direction corresponding to the direction of movement.

5. The method of claim 1, wherein controlling the action of the controlled object is performed by swiping a finger across the display, of the mobile device in a control direction corresponding to the action.

6. The method of claim 1, wherein the visual human machine interface uses an entire screen of the display of the mobile device.

7. The method of claim 1, wherein the direction control part is configured to move the controlled object in eight different directions.

8. The method of claim 1, wherein determining that the additional display device is attached to the mobile device comprises detecting, by the mobile device at a fixed clock frequency, an interface with the additional display device.

9. A device, comprising:
  a detection module configured to determine that an additional display device is attached to a mobile device; and
  a push module configured to:
  push multimedia information for the game to the additional display device to be presented by the additional display device, and
  push a visual human machine interface for the game to a display of the mobile device to be presented by the display of the mobile device,
  wherein a controlled object displayed on the additional display device is controlled by the visual human machine interface, and wherein the visual human machine interface comprises: a direction control part for controlling a direction of movement of the controlled object, the direction control part being associated with substantially a first half of the display of the mobile device and configured to move the controlled object at least up, down, left, and right, and second control part associated with substantially a second half of the display; wherein the second control part comprises a game action control part that is configured to control an action of the controlled object.

10. The device according to claim 9, wherein the visual human machine interface includes a gap area between the direction control part and the action control part.

11. The device according to claim 10, wherein a width of the gap area ranges from 0.5 cm to 1.5 cm.

12. The device according to claim 9, wherein the mobile device includes a smart phone or a tablet computer.

13. The device according to claim 9, wherein the display includes a capacitive touch screen.

14. The device of claim 9, wherein controlling the direction of movement of the controlled object is performed by swiping a finger across the display of the mobile device in a control direction corresponding to the direction of movement.

15. The device of claim 9, wherein controlling the action of the controlled object is performed by swiping a finger across the display in a control direction corresponding to the action.

16. The device of claim 9, wherein the visual human machine interface uses an entire screen of the display of the mobile device.

17. The device of claim 9, wherein the direction control part is configured to move the controlled object in eight different directions.

18. The device of claim 9, wherein determining that the additional display device is attached to the mobile device comprises detecting, by the mobile device at a fixed clock frequency, an interface with the additional display device.

* * * * *